(12) United States Patent
Johnson et al.

(10) Patent No.: US 6,868,201 B1
(45) Date of Patent: Mar. 15, 2005

(54) RECONFIGURABLE WDM MUX/DEMUX/ OADM

(75) Inventors: Princy Johnson, Harlow (GB); Bram Peeters, Harlow (GB); James E. Whiteaway, Sawbridgeworth (GB)

(73) Assignee: Nortel Networks Limited, St. Laurent (CA)

( * ) Notice: Subject to any disclaimer, the term of this patent is extended or adjusted under 35 U.S.C. 154(b) by 320 days.

(21) Appl. No.: 10/104,768

(22) Filed: Mar. 22, 2002

(51) Int. Cl.⁷ .................................................. G02B 6/28
(52) U.S. Cl. ........................................ 385/24; 398/51
(58) Field of Search .............................. 385/24; 398/45, 398/48–51, 58–73, 76, 79–88, 115–125

(56) References Cited

U.S. PATENT DOCUMENTS

| | | | |
|---|---|---|---|
| 6,020,986 A | 2/2000 | Ball | |
| 6,084,694 A | 7/2000 | Milton et al. | |
| 6,243,179 B1 | 6/2001 | Thompson et al. | |
| 6,486,988 B1 * | 11/2002 | Lewis et al. | 398/83 |
| 6,493,117 B1 * | 12/2002 | Milton et al. | 398/49 |
| 6,519,060 B1 * | 2/2003 | Liu | 398/49 |
| 6,690,848 B2 * | 2/2004 | Graves et al. | 385/16 |
| 2003/0039003 A1 * | 2/2003 | Jakobik et al. | 359/115 |
| 2003/0128985 A1 * | 7/2003 | Elbers et al. | 398/83 |

* cited by examiner

*Primary Examiner*—Akm Enayet Ullah
*Assistant Examiner*—Michelle R. Connelly-Cushwa
(74) *Attorney, Agent, or Firm*—Barnes & Thornburg LLP

(57) ABSTRACT

A reconfigurable optical add drop module has a coarse demultiplexer, for outputting sub bands of wavelengths, a fine mux/demux, for adding and/or dropping wavelengths, a coarse multiplexer, for remultiplexing the sub bands, an optical switch in between the coarse demultiplexer and the fine mux/demux, to switch the sub bands for pass through, or for add/drop. Reconfiguration can be remote, automatic, with less interruption to traffic. By switching sub bands rather than individual wavelengths, the number of switches can be reduced, and consequently losses, and space requirements can be reduced. Also, upgrading from pass through to add drop, of one or more sub bands is easier. Hence initial capital cost of nodes and the cost of upgrading can be reduced, since there is less need to provide redundant add drop capacity initially. Mid stage access enables external components to be added to the optical path for the sub bands.

26 Claims, 9 Drawing Sheets

RECONFIGURABLE WDM MUX/DEMUX/ OADM

FIELD OF THE INVENTION

This invention relates to reconfigurable optical add drop modules, to components for such modules, to hybrid components, to wafer components, to nodes for optical networks, to methods of operating such networks, and to methods of upgrading such nodes.

BACKGROUND TO THE INVENTION

In conventional optical networks, it is known to use wavelength division multiplexing to transmit multiple data channels along a single fiber. Such networks typically have multiple nodes connected in point to point, ring or mesh configurations. Optical add drop modules (OADM) are used at intermediate nodes in such networks to add or drop wavelengths, and pass through the remaining wavelengths. It has long been desired to provide reconfigurable OADMs to enable remote controlled selection of which wavelengths to add or drop at a particular node, or to control routing of wavelengths between nodes, for example for protection switching purposes. 2×2 optical switches may be provided for switching the multiplexed optical signals from one of two fibers to an OADM.

It is known from U.S. Pat. No. 6,084,694 (Milton) to have the wavelengths organized into bands, an interface at each node for dropping a band associated therewith, adding a band carrying traffic for another node, and passively forwarding other bands. This enables the bands to be passed directly between any pair of nodes in said network without the active intervention of any intervening node. The use of bands as distinct from discrete wavelengths allows the filter specifications to be relaxed in the area of sideband roll-off slope since there are cascaded filters involved at each node. A primary (or band) filter discriminates a band of wavelengths. Further sub-division into specific channels is done with a narrow width filter(s) after the band filter. The use of a multi-level filtering approach is more efficient in optical power terms than other arrangements for ring networks. This is due to the fact that the band filter is the primary filter element that is repeated around the ring. As nodes are added to the ring, the attenuation loss due to the band filter element does not rise as fast as the case where individual wavelengths are filtered out at a node with the residual band being passed on. After conversion to electrical form, a digital cross connect can enable reconfiguration of which data is transmitted on which wavelength.

Another example of a banded add drop filter is shown in U.S. Pat. No. 6,243,179 (Thompson). To reconfigure the filter to pass through a given one of the bands, fiber jumper leads can be used. In these patents the term "band" is used to indicate a subset of the wavelengths carried by the fiber, or amplified by a single optical amplifier. As this terminology is inconsistent with the terms C or L band, which are commonly used to indicate all the wavelengths carried or amplified, in contrast, in the remainder of this document, the term "band" will be used to indicate all the wavelengths, and "sub band" will indicate a subset, such as a half band, or one eighth of the band for example.

It is known to provide coarse demux on one card, to output half-band or sub band signals and wavelength or channel demux on a separate card to output individual wavelengths. The half bands or subbands are coupled between the cards by fiber patch cords. To reconfigure which wavelengths or bands are added or dropped, the patch cords, can be plugged or unplugged manually. This leaves problems of cost and delay involved in sending a worker to a remote site of the node, as well as the space or planning required to allocate space in shelves in the system, required for many such cards in a typical high density approach to the system.

As traffic over a network grows, an operator may wish a mid-life upgrade of an express node (which merely amplifies or routes the entire band or in some cases half bands with no adding or dropping of wavelengths), to an add/drop node capable of adding/dropping individual wavelengths. This will require adding additional subband demux cards, which will incur additional cost and footprint to the node as well as the operation of unplugging half band demux cards and reconnecting them to the new cards. Thus it is difficult or expensive to allow or plan for such upgrade at the time of initial installation, and may cause an undesirable interruption to service of bands being passed through. Especially in future systems, as there is a possibility for the need to upgrade to provide more amplification of coarse bands, for higher bit rates, which would involve additional planning and space for the scalable nodes, which is often impractical or expensive.

It is also known from U.S. Pat. No. 6,020,986 to provide a reconfigurable OADM which can be reconfigured without a halt in service. This uses an array of programmable fiber Bragg gratings, one for each wavelength, so that individual wavelengths can be added or dropped.

It is also known to have arrays of optical switches for switching individual wavelengths, such as well known MEMS (Micro Electro Mechanical Switches) devices coupled to a wavelength demultiplexer.

SUMMARY OF THE INVENTION

It is an object of the invention to provide improved apparatus and methods. A first aspect of the present invention provides A reconfigurable optical add drop module having:

a coarse demultiplexer, for outputting sub bands of wavelengths, at least one fine mux/demux, for multiplexing to create at least one sub band and/or demultiplexing at least one of the sub bands, a coarse multiplexer corresponding to the coarse demultiplexer, for remultiplexing at least some of the sub bands, at least one optical switch, on an optical path or paths of at least one of the sub bands between the coarse demultiplexer and the coarse multiplexer, each of the switches arranged to switch the respective sub band either for pass through from the coarse demultiplexer to the coarse multiplexer, or for coupling the respective sub band optical path with the fine mux/demux for adding or dropping at least one of the wavelengths of the respective sub band.

An advantage of such an arrangement is that the choice of which sub bands or wavelengths are added or dropped can be reconfigured remotely, or automatically, with less interruption to pass through sub bands. By switching sub bands rather switching individual wavelengths, the number of switches can be reduced, and consequently optical losses, space requirements and costs can all be reduced. Also, such switching enables easier upgrading from pass through to add drop, of one or more sub bands. Hence initial capital cost of nodes can be reduced, since there is less need to provide redundant add drop capacity initially, since it is relatively easy to add it later. The term "optical switch" is intended to encompass anything which can achieve the function of diverting light from one path to another, and is reconfigurable, either remotely or locally, manually or automatically. This would include optical couplers, mechanical switches, MEMs, liquid crystal devices, or any of the many other technologies which can achieve this.

As a preferred feature, the module can have a middle mux/demux stage in between the fine demux and the one or more switches. This can relieve the performance requirements of each stage of the multiplexing and demultiplexing, and enable the switching to be carried out at a coarser granularity, to reduce the number of switches.

Another preferred feature involves having a second set of one or more switches in between the middle mux/demux stage and the fine demux for selectively passing through one or more of the demultiplexed sub bands. An advantage of this is to reduce further the use of manually connected patch cords, to make reconfiguration easier and more reliable. This also enables "hot reconfiguration" which means immediate reconfiguration without the need to wait for manual intervention and a site visit.

Preferably, the coarse demultiplexer comprises two stages of demultiplexing. At least the switch and the fine mux/demux can be arranged in the same component, the component having at least part of an optical path for the respective sub band between the switch and the fine mux/demux, the optical path having an interface to allow another optical component to be inserted in the optical path. This is useful to facilitate upgrading or to enable adaptation of standard components for different applications.

Preferably, the middle mux/demux stage or the fine mux/demux comprise a number of multiple input arrayed waveguide devices arranged on a common substrate. An advantage of this is that they can be manufactured together, with a common design, and different inputs used for different sub bands. This can simplify design, and reduce component count, and thus reduce inventory and so reduce costs of manufacturing and servicing.

Preferably the module is arranged as two complementary components, one being a multiplexing half, the other being a demultiplexing half, with optical path interfaces for optical coupling of pass through sub bands between the two complementary components. This is a useful way to divide the arrangement if there is not sufficient space for everything on one component, since it can enable the complementary components to be identical, thus reducing the number of different components, thus simplifying inventory and reducing costs of manufacturing and servicing.

Preferably the module has one or more amplifiers for amplifying one or more of the sub bands individually.

Preferably the module comprises a hybrid package having at least the coarse demultiplexer, one or more of the switches, and a demultiplexer part of the fine mux/demux.

Preferably the coarse demultiplexer or the coarse multiplexer are formed using a different technology (such as dielectric film filters) to that used for the fine mux/demux.

Another aspect provides a node for an optical network, having one or more of the modules or one or more of the components, wafers or hybrids. This aspect reflects that the benefits of the component bring great value to the node by making it reconfigurable and reducing the footprint.

Another aspect provides a method of adding or dropping sub bands of wavelengths, having the steps of:

coarsely demultiplexing a wavelength multiplexed optical signal to output sub bands of wavelengths, remultiplexing at least some of the sub bands, using at least one optical switch, on an optical path or paths of at least one of the sub bands to switch the respective sub band either for pass through to the remultiplexing step, or for coupling the respective sub band optical path with a fine mux/demux for adding or dropping, and using the fine mux/demux to multiplex to create the sub band for adding, and/or demultiplexing the sub band for dropping, Another aspect provides a method of offering a data transmission service by operating an add drop module using the above steps. This reflects the fact that the benefits can enable operators to offer a more competitive service, and resulting revenue could be much more valuable than the equipment cost reductions.

Another aspect provides a method of operating an optical network using a remote network management or control system to reconfigure the node, having the steps of receiving a prompt to reconfigure, and sending a command to the module to control one or more of the switches. An advantage of using a network management or control system is that particularly for complex networks, such centralization can enable more efficient network operation.

Another aspect provides a component for a reconfigurable optical wavelength add drop module, the component having:

a coarse demultiplexer, for outputting sub bands of wavelengths, at least one fine mux/demux, for adding and/or dropping wavelengths from one or more of the sub bands, a coarse multiplexer corresponding to the coarse demultiplexer, for remultiplexing the sub bands, and at least part of an optical path for coupling one of the sub bands between the coarse demultiplexer and the fine mux/demux, the optical path having an interface to allow another optical component to be inserted in the optical path.

An advantage of allowing such mid stage access is that it can enable a standard component to be adapted or upgraded more easily, while maintaining a relatively high level of integration to keep the component count low. The other optical components which could usefully be inserted include demuxers, amplifiers, attenuators, dispersion compensators, optical power equalizers and so on.

Another aspect provides a hybrid packaged component suitable for an optical add drop module, the component having a coarse mux/demux element, a fine mux/demux element of a different type, and at least part of an optical path for coupling between the coarse and the fine elements, the optical path having an external interface to allow another optical component to be inserted in the optical path.

Similar advantages apply. As a hybrid, it enables devices using different technologies, optimized for each device, to be integrated and thus reduce part count.

Preferably the component has an optical switch for switching between a pass through and an add/drop state.

Another aspect provides a single wafer component having a fine mux/demux element and a middle mux/demux element, suitable for the module aspects of the invention and having at least part of an optical path for coupling between the middle and the fine elements, the optical path having an external interface to allow another optical component to be inserted in the optical path.

Preferably the wafer component has an optical switch for switching between a pass through and an add/drop state.

Preferably the coarse mux/demux element comprises a dielectric filter.

Any of the preferred Features may be combined with each other or any of the aspects. Other advantages may be apparent to those skilled in the art especially over other prior art not known to the inventors.

BRIEF DESCRIPTION OF THE DRAWINGS

Embodiments of the invention will now be described to show how the invention can be implemented by way of examples with reference to the figures in which.

DETAILED DESCRIPTION

Figure 1:
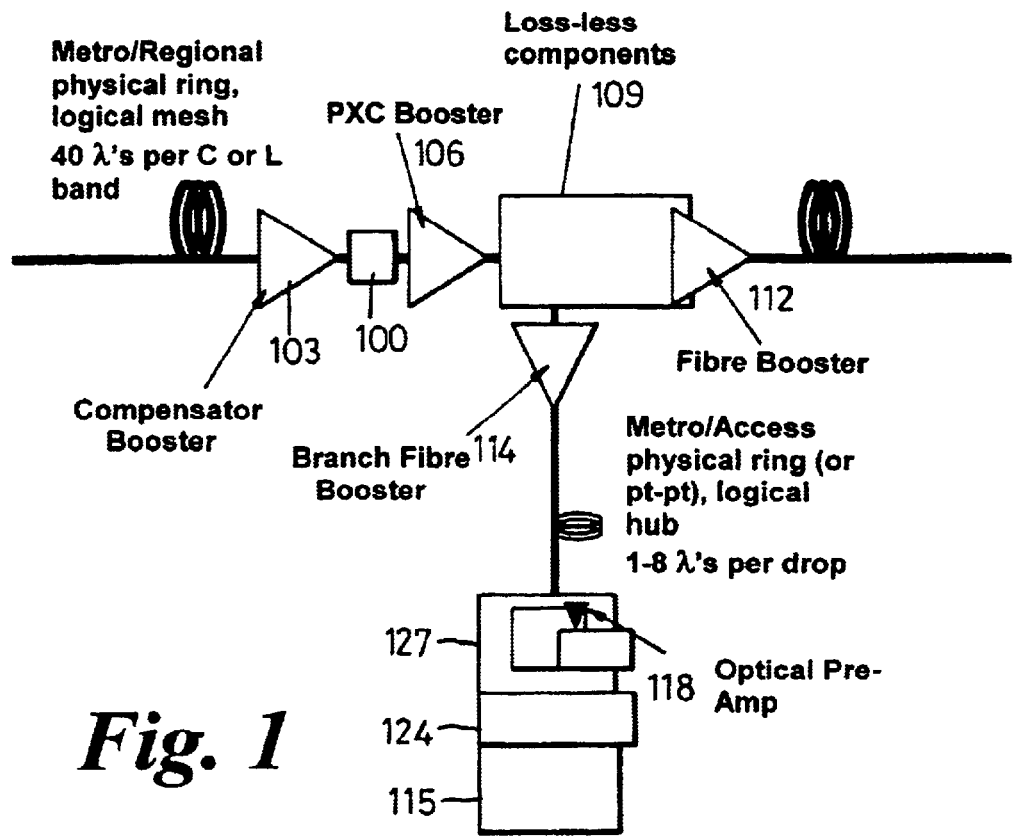
FIG. 1 shows a node of an optical network, having an OADM.

FIG. 1 shows some of the principal features of a node for adding or dropping wavelengths from a high capacity network. In this case the network is a metro or regional network arranged in bidirectional rings, coupled to form a logical mesh. One fiber is shown, though in practice there would be typically 2 or 4, or multiples of 2 or 4. Each carries 32/40 wavelengths in one direction in the C band or the L band. A compensator 100 is provided on the input side of the node, if required for dispersion or polarisation mode dispersion compensation across the spectrum. As discussed below, additional compensation can be provided on each sub band, to give finer or more efficient compensation. If required, a compensation booster 103 can be provided before the compensator, to amplify the optical signal. Another booster 106 can be provided before the OADM component 109, to compensate for optical power losses in the OADM component.

A higher power booster 112 is provided on the output side for transmitting the pass through and the added wavelengths on to the next node. Dropped wavelengths can be terminated by conversion to electrical data signals, either at the node, or after passing over a local or access optical fiber or local ring. This is controlled as a logical hub. As shown, a branch fiber booster 114 may be provided for amplifying the dropped optical signal to provide sufficient reach to the next node in the local network. The terminal 115 includes an optical pre amp 118, a receiver 121, a backplane 124, and a transmitter 127. Other elements of the optical path in the other direction for adding wavelengths are not shown for the sake of clarity. Control channels may be provided along the fibers or separately, for passing network management information to and from a remote network management system or network control system for controlling routing of wavelengths or bands.

FIG. 2, OADM

Figure 2:
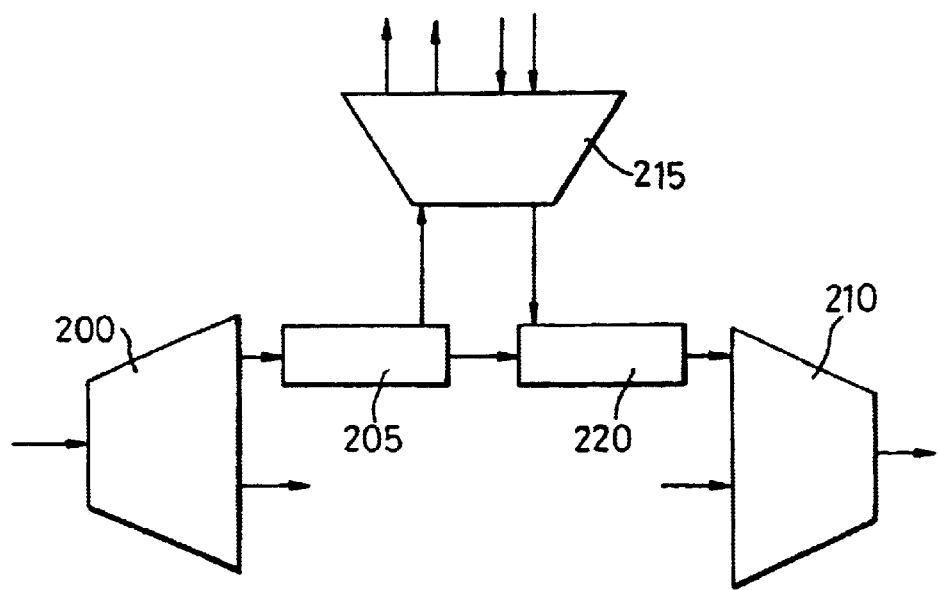
FIG. 2 shows an OADM according to an embodiment of the invention.

FIG. 2 shows some of the principal elements of an OADM for use in the network shown in FIG. 1 or other optical networks. As in FIG. 1, features are shown relating to one direction of data traffic, whereas in practice there will often be corresponding features for processing data traffic in the other direction. The incoming multiplexed signal on the high capacity ring network is demultiplexed by a coarse demultiplexer 200. One or more of the demultiplexed signals are fed to a first optical switch 205. This routes the signal either for pass through via a coarse multiplexer 210, or for dropping via a fine mux/demux 215. A second switch 220 is shown for adding signals from the mux/demux into the high capacity ring, via the coarse multiplexer 210. References to multiplexing, demultiplexing, (ormux or demux) are intended to refer to operations carried out in the optical domain, not electrical signal multiplexing or demultiplexing.

Some or all of the sub bands output by the coarse demux may be switched. The first and second switches can be integrated together into a single switch. Other components can be added at various points in the optical paths, though more components may introduce more loss.

When installing such an OADM, if a pass through only node is required at first, then the switches can be set for pass through. The fine mux/demux may be left out, if it is mounted in a separate package. When an upgrade is desired, to provide add drop capability, if it is not already there, a fine mux/demux is added, and fibers for the added or dropped wavelengths are coupled to the OADM. Then the switches can be switched to enable the add drop to take place. The switches may be configured locally at the time of plugging in the add drop fibers, or controlled remotely from a network management system. This can minimise disruption to other optical paths, if no cards need be extracted and changed. Also, the amount of space needed for optical patch cords and fiber connectors can be reduced. As the amount of manual intervention required for the upgrade is reduced, the risk of damage or misconnection is reduced.

Figure 3:
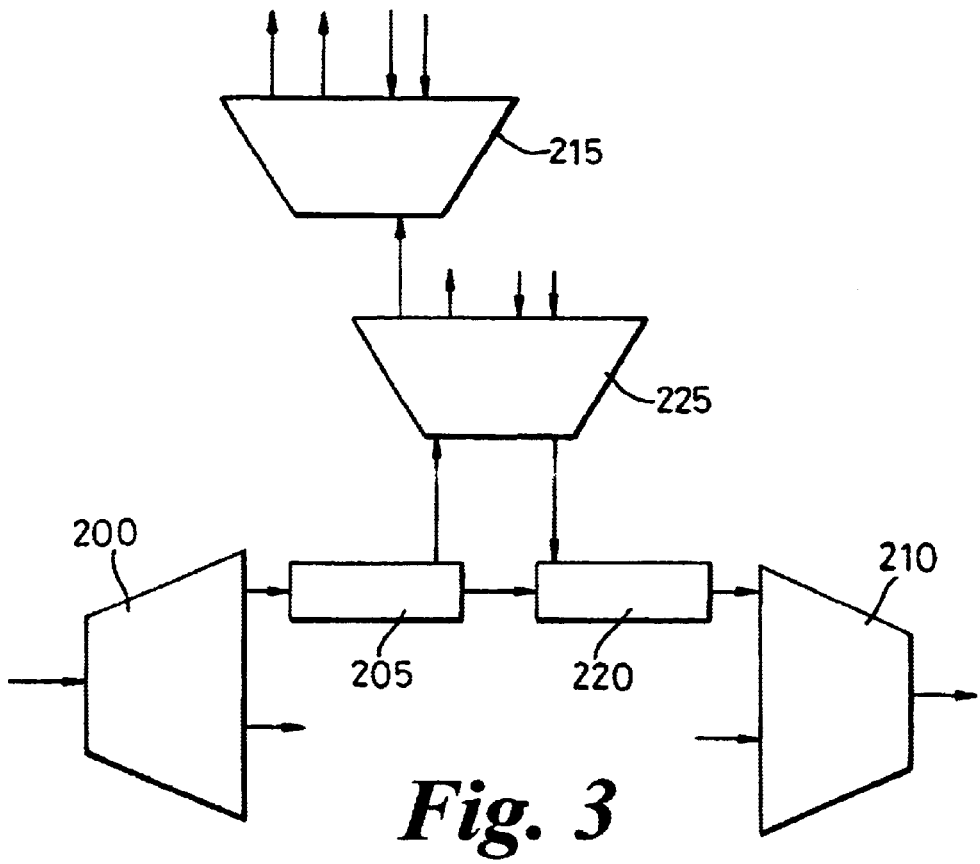
FIG. 3 shows another OADM according to an embodiment of the invention, having a middle mux/demux stage.
Figure 4:
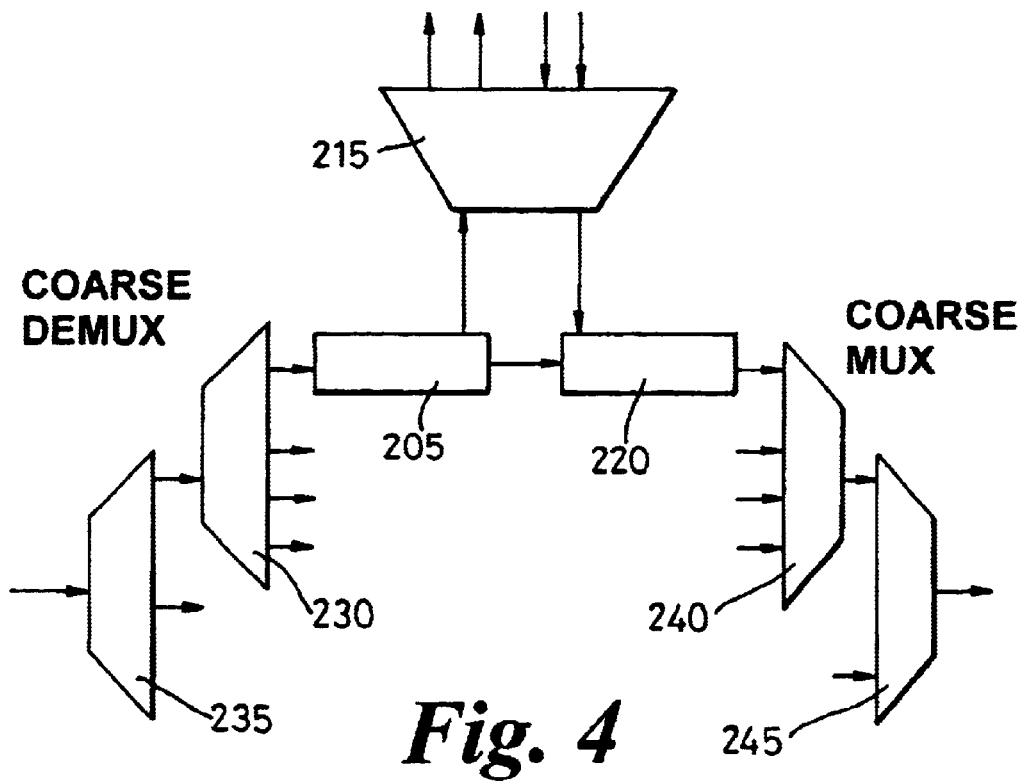
FIG. 4 shows another OADM according to an embodiment of the invention, having a two stage coarse demux.

FIGS. 3, 4, Multi Stage Mux/demux

Figure 5:
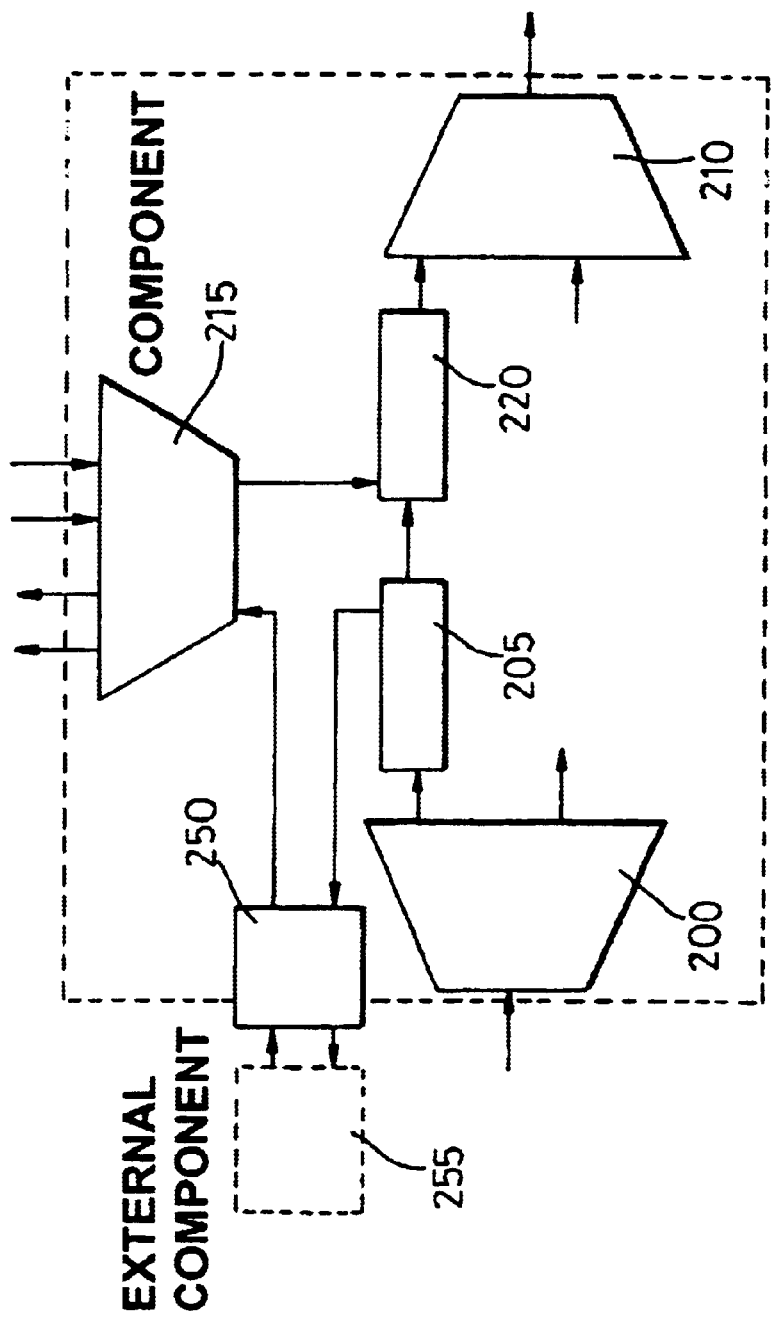
FIG. 5 shows another OADM according to an embodiment of the invention, having mid stage access.

In FIGS. 3, 4 and 5, the arrangement is similar to that of FIG. 2, and the same reference numerals are used as appropriate. In FIG. 3, a middle mux/demux stage 225 is provided, coupled at the output of the first switch 205. It feeds the fine mux/demux, and enables a coarser level of switching, and can enable the performance requirements of each level of mux/demux, to be relaxed. In one example, the switching is carried out on half bands, thus minimizing the number of optical switches, and enabling the coarse demux stage to be carried out using less expensive, easier to manufacture devices, such as dielectric filters. The middle stage can be a 1 to 4 mux/demux arrangement, leaving 4 wavelengths in each sub band for the fine mux/demux to filter for a system having 32 wavelengths in total. For the sake of clarity, not all are illustrated. Other mux/demux ratios can be used.

In FIG. 4, the coarse demux is implemented in two stages. A first stage 235 splits the band into two half bands, and a second stage 230 splits each half band further into four sub bands. The switches 205 and 220 are arranged to switch these sub bands either for pass through or add drop. A corresponding two stage coarse multiplex has a 4-1 first stage 240, and a 2-1 second stage 245. Other ratios can be used.

FIG. 5, Mid Stage External Access

In FIG. 5, a component 247 such as a card, a hybrid, a wafer and so on, has the above mentioned optical elements, and optical paths between the elements, using waveguides or sections of fiber for example. External optical couplings are provided for the inputs and outputs of the component, and additionally access is provided to one or more of the internal optical paths. This is shown by the optical interface 250 in the form of a pair of optical couplings such as fiber connectors, or fiber tails and so on. This external access enables other components to be inserted in the optical path, for processing the optical signal at the sub band level. Examples of external components include monitoring devices having optical taps, optical amplifiers, dispersion compensators, PMD compensators, gain equalizers, attenuators, pass through switches (if these are not on the component) and so on. By inserting such devices at the sub band stage, rather than on each wavelength, the number of devices can be reduced, and so costs can be reduced. Compared to inserting such devices on the entire band rather than the sub bands, finer control or monitoring is possible. The level of integration is maintained higher by having the coarse and fine mux/demux or the switch and fine mux/demux on the same card. Also, the optical interface can be provided with a bypass switch to switch the external access in or out of the optical path.

Figure 6:
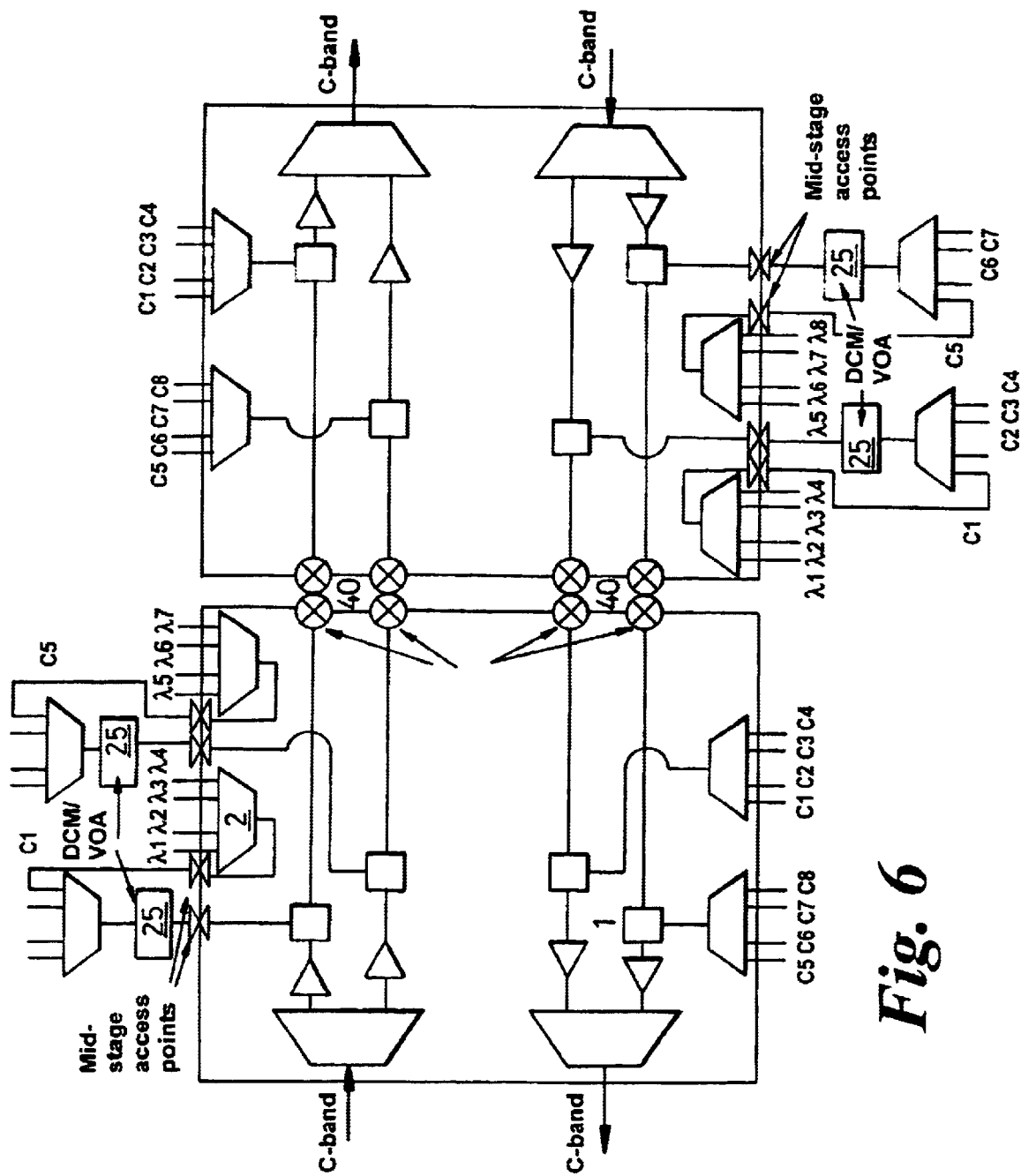
FIG. 6 shows another OADM according to an embodiment of the invention, in two halves.

FIG. 6, OADM Module Formed in Two Halves.

FIG. 6 shows an example of a module having many features corresponding to those mentioned above, and arranged in two identical halves. A C band optical signal is fed to coarse demultiplexer 5. Each half band is amplified by optical amplifiers 10, in the form of semiconductor optical amplifiers (SOA) before reaching the pass through switches 15. One output of the pass through switches is fed to an external demultiplexer 30 via the mid stage external access interface 35. One or more fine demultiplexers 20 enable one or more of the demultiplexed sub bands C1, C5 to be further demultiplexed down to individual wavelengths 1 to 8. The other demultiplexed sub bands C2, C3, C4, C6, C7, C8 can be passed through via external connections (not shown) to corresponding multiplexers 31 on the other half component. Optionally, another external component such as a DCM (dispersion compensation module) or VOA (variable optical attenuator) 25 can be placed in the optical path, to process the sub bands.

Figure 7:
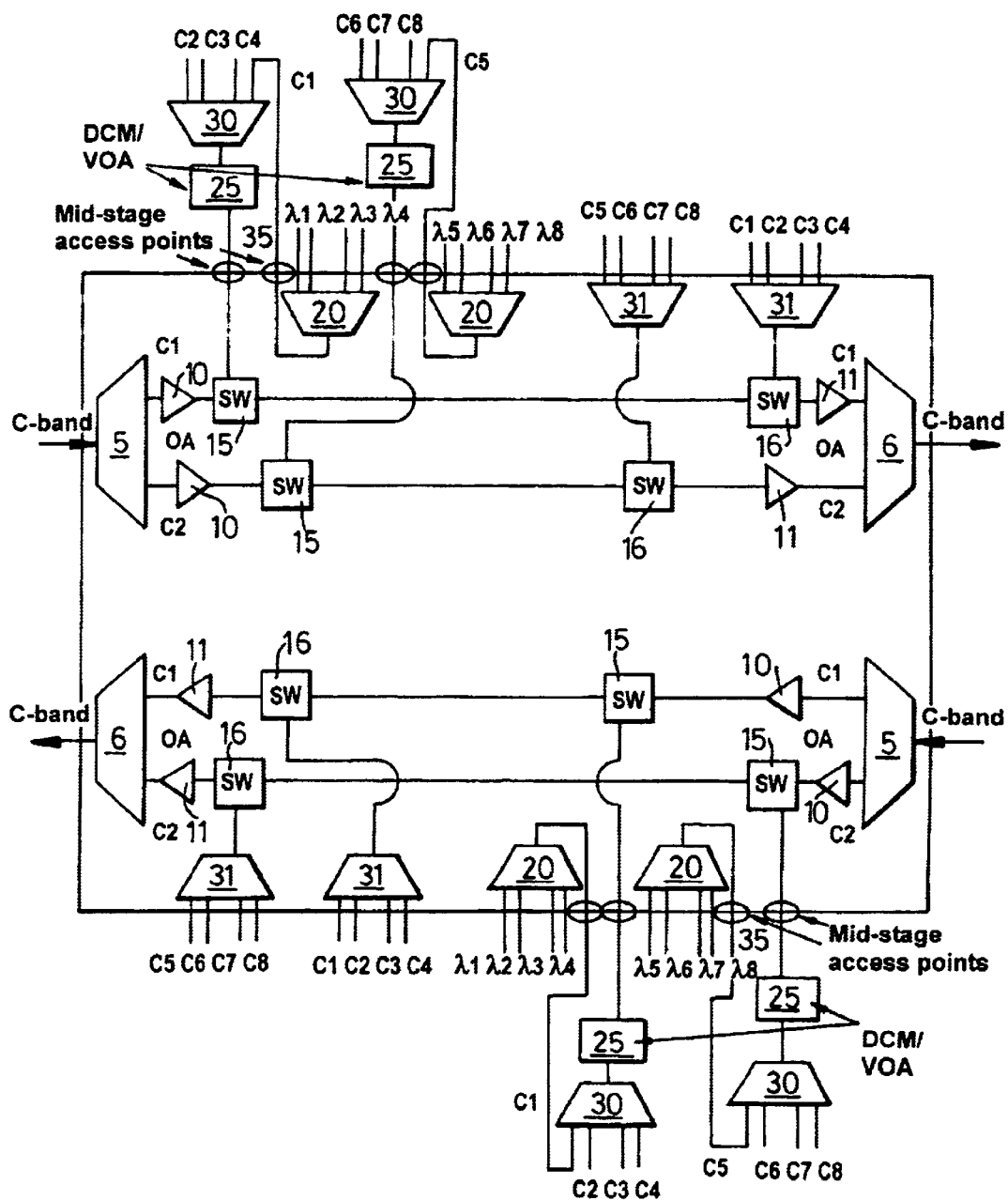
FIG. 7 shows another OADM according to an embodiment of the invention, formed as a single component such as a card.

An optical path is provided for the half band signal from each of the switches 15 for pass through, to the other half component, via optical connectors 40. On this other half component, corresponding pass through switches 16 are provided for adding sub bands from the multiplexers 31. An amplifier 11 is provided after the switches, before the coarse multiplexer 6, which outputs the complete C band signal on to the next node. Corresponding elements can be provided optionally on each half component for carrying out the same functions on the C band signal for the other direction around the ring. FIG. 7 shows an identical arrangement as FIG. 6 except that the two half components are integrated as one single component such as a card.

Figure 8:
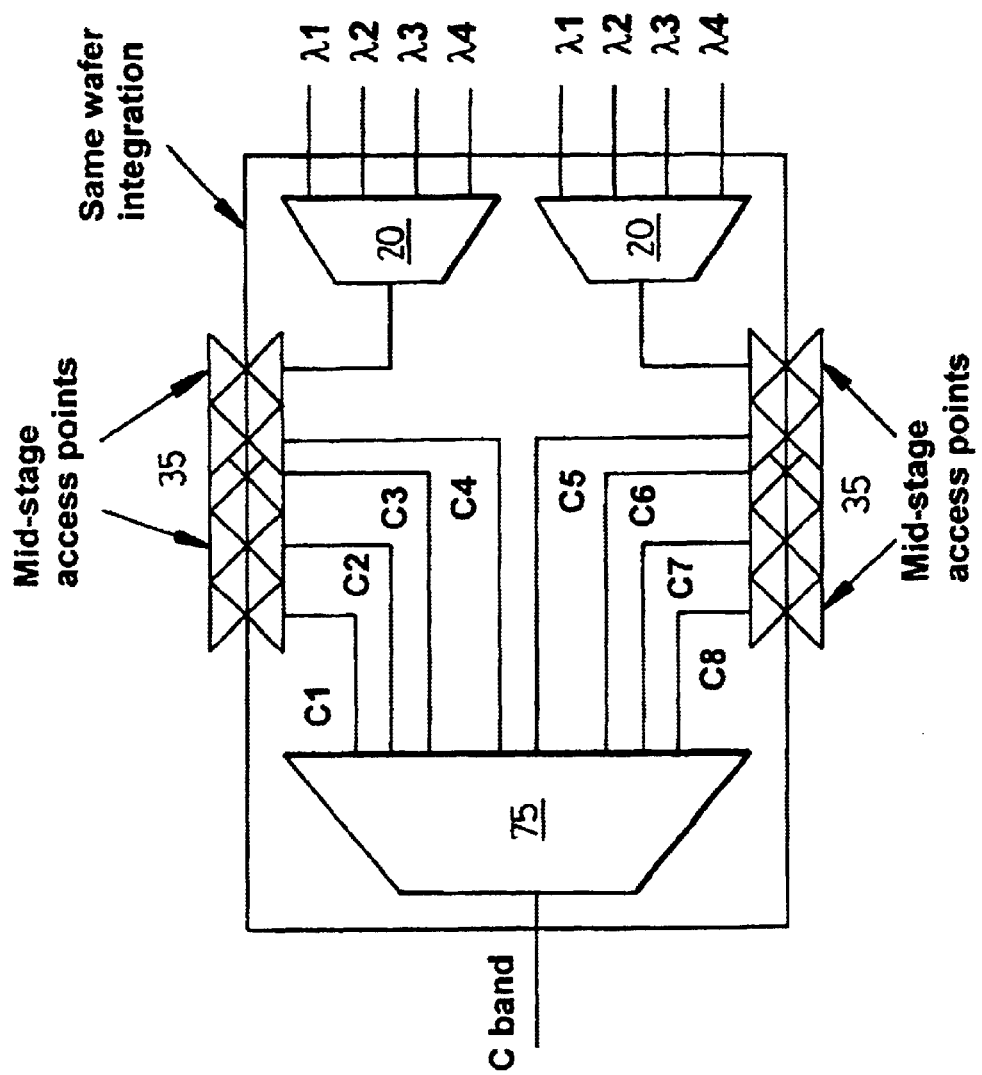
FIG. 8 shows a component for an OADM according to an embodiment of the invention, having a single wafer.

FIG. 8, Component for an OADM Having a Single Wafer

This figure shows a wafer for integrating a number of the above optical elements. Such a wafer can be used as part of the OADM components of half components described above, or as part of other OADM arrangements. Coarse and fine demuxers can be mounted on the same wafer, with external access to the optical path between them, to allow other elements such as switches to be inserted. Even the switches could be left out initially, for lower starting cost, yet allow upgrade later to include such switches, or other components, without having to replace this wafer.

In the wafer illustrated, the coarse demux 75 is arranged as a single stage demux outputting sub bands C1–C8, and two fine demuxs 20 each taking one sub band and outputting four wavelengths. This arrangement is suited to arrayed waveguide (AWG) type mux or demux devices, or any other technologies for which it is cost effective to have more than one device on a single wafer, to reduce part count and assembly and alignment costs. It is possible to use so called colourless AWGs, which have two or more inputs on the multiplexed side, so that different bands can be multiplexed or demultiplexed by the same device depending on which input is used.

Mid stage access points 35 are provided where the optical paths for the sub bands are taken to the edge of the wafer. This enables optical coupling to other optical elements which may be mounted on the same component or half component as the wafer, or optical coupling via fiber tails for example to other substrates or cards.

Figure 9:
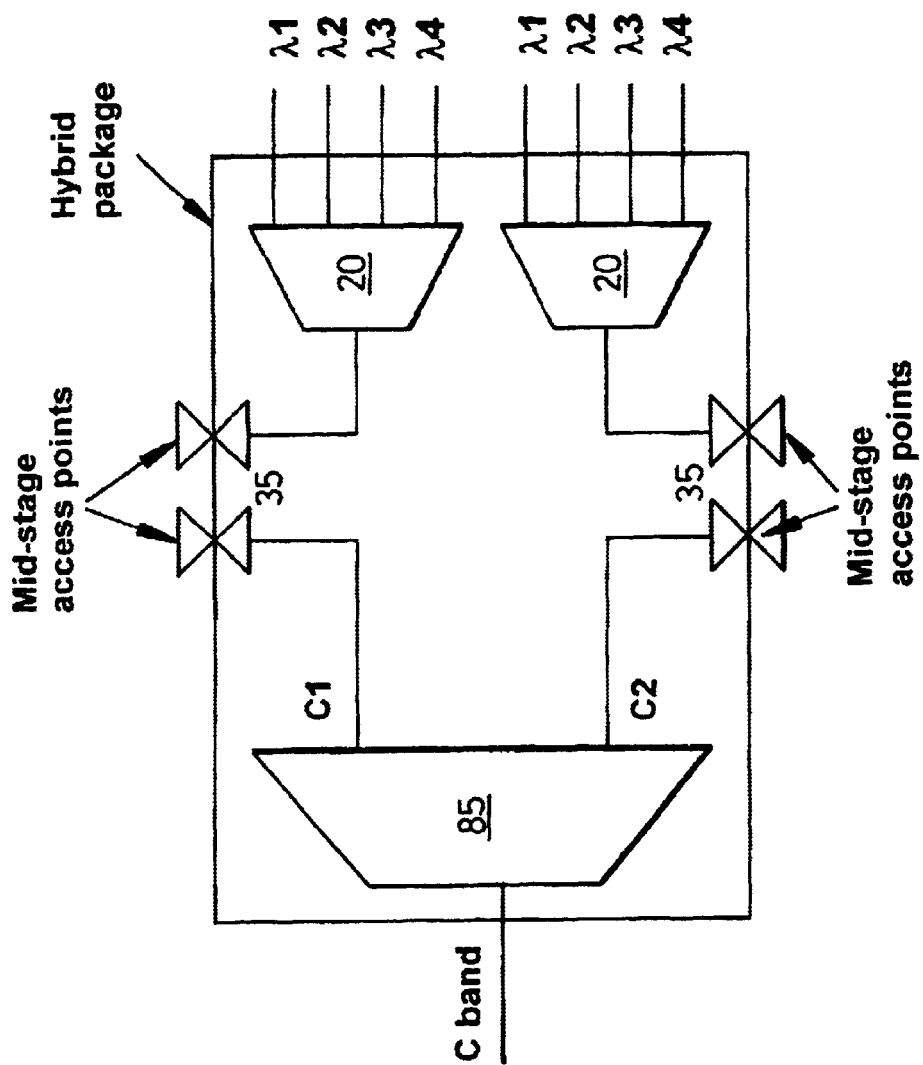
FIG. 9 shows a hybrid package for an OADM according to an embodiment of the invention.

FIG. 9, a Hybrid Package

In the example shown in FIG. 9, a coarse demux 85 uses a different technology to the two fine demuxes 20. The coarse demux outputs two half bands C1 and C2. It can use a technology such as dielectric filter technology, which can be manufactured more easily, using thin films for example, but is less suitable for narrow sub bands, using the same design to operate on different bands, than the AWG technology used for the fine demuxes. Thus a hybrid package is used to enable integration of demuxes or muxes of different technologies on the same package. The mid stage access points 35 in this case include points for the half bands to be output, and points for sub bands to be input after further demux off the package. Such a hybrid package can be used as part of the OADM components of half components described above, or as part of other OADM arrangements.

Figure 10:
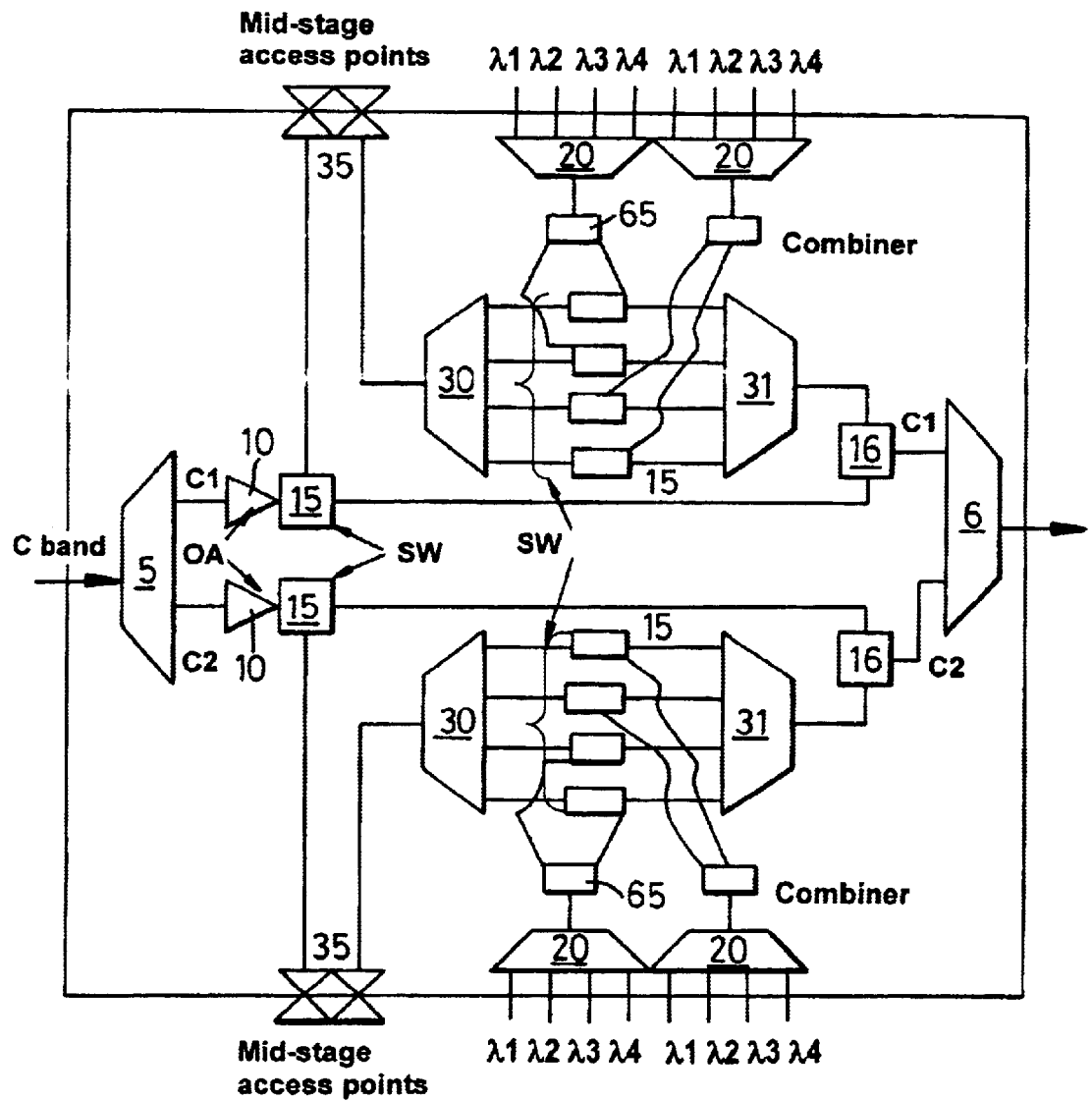
FIG. 10 shows another OADM according to an embodiment of the invention, with two levels of pass through, and FIG. 11 shows a wafer for an OADM according to an embodiment of the invention, having switches and mid stage access.

FIG. 10, OADM with Two Levels of Pass Through

This arrangement of this figure corresponds in some respects to that shown in FIG. 7 but altered to show only one of the two directions of data flow, for the sake of clarity, and to show pass through switching at both the half band level and also at a the demultiplexed sub band level. Also, the middle stage mux/demuxes are on board the component. Mid stage access points are provided for accessing the optical paths carrying the coarsely demuxed sub bands, in this case half bands. The optical paths from these points continue to the middle demux stages 30. The outputs of these demuxes are fed to a second set of pass through switches 65. These route the sub bands either for pass through to corresponding middle mux stages 31, or for dropping to the fine demuxes 20. A combiner 67 can be provided for selectively routing either of two or more demultiplexed sub bands to a given one of the fine demuxers 20. Optionally external access can additionally be provided (not illustrated) at some or all of the outputs of the middle demux stages, before the fine demuxes, for additional optical processing of these sub bands. In all cases, if desired, the external access can be before the respective switch if it is desired to process the pass through sub bands as well as the dropped sub bands. The component can be implemented as a hybrid package having a dielectric coarse level mux/demux.

Figure 11:
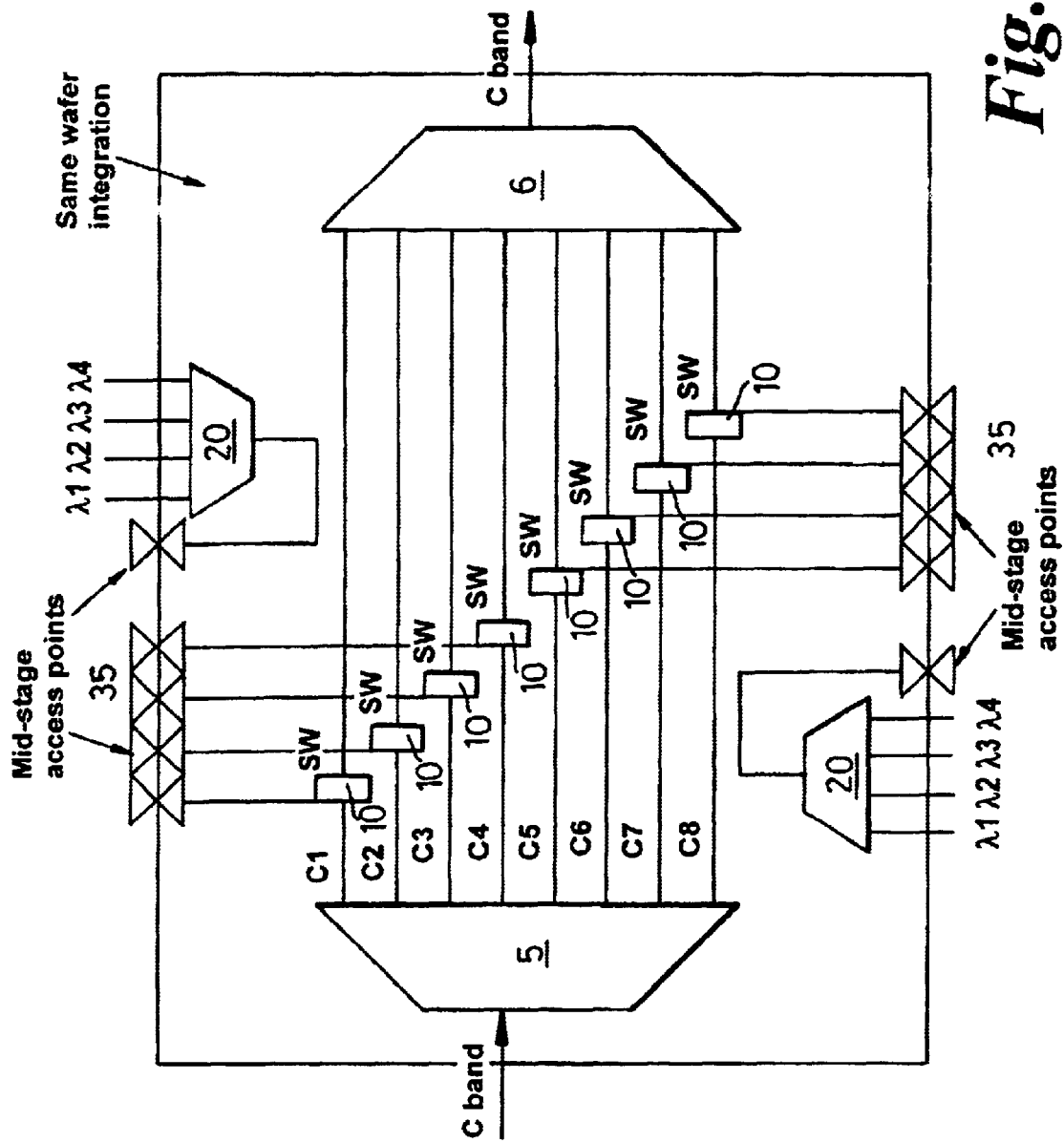

FIG. 11, Wafer for an OADM Having Switches and Mid Stage Access

This figure shows an example in which two stages of mux/demux can be integrated on one wafer. AWG type coarse and fine mux/demux devices, 5, 6, 20 are integrated with pass through switches 10. The switches are arranged to route the sub bands C1 to C8 either for pass through or to the external access points 35. The coarse multiplexer 6 multiplexes the pass through bands together to output the C band to the next node.

By arranging the external access points and the fine mux/demuxes on both sides, the number of overlapping optical paths can be reduced. If the wafer is split into two, with the coarse mux on another wafer, it would be possible to avoid overlaps and thus reduce the number of layers required on the wafer.

The AWG elements can be used in either direction, as mux or demux elements. Likewise, the optical switches can also be used in either direction. Hence any of the sub bands can be either dropped or added as desired. If it is desired to add and drop the same wavelength, two switches and separate fine mux/demux devices should be provided as shown in FIG. 7 for example.

Other Variations and Concluding Remarks

As described above, the midstage accessible filter can be an integrated module consisting of a coarse WDM (that separates the C/L band into two half bands) and two individual sub-band demux's (that divides the half C/L band into 4 sub-bands) on a single chip/package. The module will provide external access points to the connection between the coarse and the sub-band demux's. The network operator will have to buy the whole module at first to deploy it in a node. If the node is an express pass through site, in that the bands are not dropped but passed through, the customer then could use the output from the coarse WDM to express pass through the node. Later on, when the operator has the need to upgrade the express node into a add/drop node (he has to drop/terminate some bands because he gets some clients around that node site), he could connect the midstage access points either directly using a mechanical connector or employ a cheap OA (optical amplifiers) (SOA), or even employ a half band DCM module between the midstage access points (to compensate the dispersion in the half C/L band). This would add value to the operator in that it can reduce cost and the footprint of the filter module while maintaining scalability or upgradability of the node.

By integrating a switch and amplifiers in this module, other functionalities could be added which will enable the operator to use this module for express pass/multicast/drop/terminate/reuse bands. It can reduce the cost and footprint of the filter module when upgrading an express node to an add/drop/terminate node. It also offers the flexibility to the operator to add an amplification/DCM module between the coarse and the sub-band demuxes if necessary, during upgrade. Integrated design of different filter modules with midstage access points and mechanical connectors with space for additional components like OAs. Reducing the upgrade cost and footprint of the filter modules in the scalable nodes of network architectures, and making the upgrade less complicated and user friendly has significant commercial value.

Hybrid integration or co packaging of three types of filter designs enables a 'midstage accessible filter' module, where other processing such as dispersion compensation can be performed, in addition to having the freedom of being able to drop any two 4-ch bands at a node site with minimum disruption to the service. This is done, by installing a single card (such as that shown in FIG. 7) containing coarse and colourless fine filters with the midstage access points at initial installation, when there is no necessity for any channel dropping. The C-band is express passed in both the directions by selecting the appropriate positions of the switches provided. This need not increase the initial cost or capital expenditure (Capex) by a significant amount as all the same level filters can be of a single design, which reduces inventory and thus cost.

In the next step, in mid life, when the network operator has customers at this node site, and so there is a need to drop one or more channels, the switch positions are changed so as to route the half C-bands to the midstage access points, at which the band filters could be connected. By installing a band filter card (this could have been installed earlier, in which case the switching could be done without noticeable disruption to the traffic), the desired bands can be dropped and the other bands connected so that they will pass through. Here also, the total 'Capex' and operating cost (Opex) can come down because of the use of generic design filters. Also, the optical signal power need not drop to very low value if the low cost optical amplifiers are employed before the switches. In addition to the band drops, additional operations such as half-band dispersion compensation could be performed in long spans.

Using either thin-film filter technology or multiple wave plate technology available from Chorum, the coarse dielectric filter modules can be implemented. The middle and fine stage filter modules can be implemented using a colourless AWG technology such as the 2×4 AWG Mux/Demux device shown in Nortel Networks US patent application, internal ref 13623ID, hereby incorporated by reference. Using this one-design for many filters reduces inventory and cost considerably. Thus this proposed module can increase the functionality and scalability of the system without increasing the total cost.

As has been described above, a reconfigurable optical add drop module has a coarse demultiplexer, for outputting sub bands of wavelengths, a fine mux/demux, for adding and/or dropping wavelengths, a coarse multiplexer, for remultiplexing the sub bands, an optical switch in between the coarse demultiplexer and the fine mux/demux, to switch the sub bands for pass through, or for add/drop. Reconfiguration can be remote, automatic, with less interruption to traffic. By switching sub bands rather than individual wavelengths, the number of switches can be reduced, and consequently losses, and space requirements can be reduced. Also, upgrading from pass through to add drop, of one or more sub bands is easier. Hence initial capital cost of nodes and the cost of upgrading can be reduced, since there is less need to provide redundant add drop capacity initially. Mid stage access enables external components to be added to the optical path for the sub bands.

Other variations will be apparent to those skilled in the art and are intended to be encompassed within the scope of the claims.

What is claimed is:

1. A reconfigurable optical add drop module having:
   a coarse demultiplexer, for outputting sub bands of wavelengths,
   a fine mux/demux, for multiplexing to create at least one sub band and/or demultiplexing at least one of the sub bands,
   a coarse multiplexer corresponding to the coarse demultiplexer, for remultiplexing at least some of the sub bands,
   a plurality of optical switches, each on an optical path of a different one of the sub bands between the coarse demultiplexer and the coarse multiplexer, and wherein each of the plurality of switches are arranged to switch the respective sub band either for pass through from the coarse demultiplexer to the coarse multiplexer, or for coupling the respective sub band optical path with said fine mux/demux for adding or dropping at least one of the wavelengths of the respective sub band.

2. The module of claim 1 having a middle mux/demux stage in between the fine demux and the plurality of switches.

3. The module of claim 2 having a second set of one or more switches in between the middle mux/demux stage and the fine demux for selectively passing through one or more of the demultiplexed sub bands.

4. The module of claim 2, the middle mux/demux stage or the fine mux/demux comprising a number of multiple input arrayed waveguide devices arranged on a common substrate.

5. The module of claim 1, the coarse demultiplexer comprising two stages of demultiplexing.

6. The module of claim 1, at least the plurality of switches and the fine mux/demux being arranged in the same component, the component having at least part of an optical path for the respective sub band between the switch and the fine mux/demux, the optical path having an interface to allow another optical component to be inserted in the optical path.

7. The module of claim 1, arranged as two complementary components, one being a multiplexing half, the other being a demultiplexing half, with optical path interfaces for optical coupling of pass through sub bands between the two complementary components.

8. The module of claim 1 having one or more amplifiers for amplifying one or more of the sub bands individually.

9. The module of claim 1, comprising a hybrid package having at least the coarse demultiplexer, one or more of the plurality of switches, and a demultiplexer part of the fine mux/demux.

10. The module of claim 1, the coarse demultiplexer or the coarse multiplexer being formed using a different technology to that used for the fine mux/demux.

11. The module of claim 10, the coarse demultiplexer or coarse multiplexer comprising a dielectric film type filter.

12. A node for an optical network, having one or more of the modules of claim 1.

13. A method of operating an optical network using a remote network management or control system to reconfigure the node of claim 12, having the steps of receiving a prompt to reconfigure, and sending a command to the module to control one or more of the switches.

14. A single wafer component having a fine mux/demux element and a middle mux/demux element, suitable for the module of claim 1 and having at least part of an optical path for coupling between the middle and the fine elements, the optical path having an external interface to allow another optical component to be inserted in the optical path.

15. The wafer component of claim 14 having an optical switch for switching between a pass through and an add/drop state.

16. The module of claim 1, wherein said fine mux/demux comprises a plurality of inputs, wherein each of said plurality of switches couples to a different one of said plurality of inputs and wherein said fine mux/demux is arranged to demultiplex different sub bands depending on the input used.

17. A method of adding or dropping sub bands of wavelengths, having the steps of:

coarsely demultiplexing a wavelength multiplexed optical signal to output sub bands of wavelengths, remultiplexing at least some of the sub bands, using a plurality of optical switches, each on an optical path of a different one of the sub bands to switch the respective sub band either for pass through to the remultiplexing step, or for coupling the respective sub band optical path with a same fine mux/demux for adding or dropping, and using the fine mux/demux to multiplex to create the sub band for adding, and/or demultiplexing the sub band for dropping.

18. A method of offering a data transmission service by operating an add drop module using the steps of claim 17.

19. The method of claim 17, wherein said fine mux/demux comprises a plurality of inputs, wherein each of said plurality of switches couples to a different one of said plurality of inputs and wherein said fine mux/demux is arranged to demultiplex different sub bands depending on the input used.

20. A component for a reconfigurable optical wavelength add drop module, the component having:

a coarse demultiplexer, for outputting sub bands of wavelengths, a fine mux/demux, for adding and/or dropping wavelengths from one or more of the sub bands, a coarse multiplexer corresponding to the coarse demultiplexer, for remultiplexing the sub bands, and a plurality of optical switches each on an optical path of a different one of the sub bands between the coarse demultiplexer and the coarse multiplexer, wherein each of said plurality of switches is arranged to switch the respective sub band either for pass through to the coarse multiplexer, or for coupling the respective sub band between the coarse demultiplexer and said fine mux/demux via an optical path having an interface to allow another optical component to be inserted in the optical path.

21. The component of claim 20, wherein said fine mux/demux comprises a plurality of inputs, wherein each of said plurality of switches couples to a different one of said plurality of inputs and wherein said fine mux/demux is arranged to demultiplex different sub bands depending on the input used.

22. A hybrid packaged component suitable for an optical add drop module, the component having a coarse mux/demux element, a fine mux/demux element of a different type having a plurality of inputs, and a plurality of optical switches for coupling between the coarse mux/demux and the inputs of said fine mux/demux via optical paths having an external interface to allow another optical component to be inserted in the optical path.

23. The component of claim 22, having an optical switch for switching between a pass through and an add/drop state.

24. The component of claim 22, the coarse mux/demux element comprising a dielectric filter.

25. A node for an optical network having the component of claim 22.

26. The component of claim 22, wherein said fine mux/demux is arranged to demultiplex different sub bands depending on the input used.

* * * * *